United States Patent
Winter

(10) Patent No.: US 7,025,329 B2
(45) Date of Patent: Apr. 11, 2006

(54) NEEDLE VALVE FOR FLOW CONTROL

(75) Inventor: David Phillip Winter, Encinitas, CA (US)

(73) Assignee: Sequal Technologies, Inc., San Diego, CA (US)

( * ) Notice: Subject to any disclaimer, the term of this patent is extended or adjusted under 35 U.S.C. 154(b) by 27 days.

(21) Appl. No.: 10/835,700

(22) Filed: Apr. 30, 2004

(65) Prior Publication Data

US 2005/0242314 A1 Nov. 3, 2005

(51) Int. Cl.
*F16K 31/44* (2006.01)

(52) U.S. Cl. .................. 251/218; 251/129.11; 251/330; 251/903

(58) Field of Classification Search .......... 251/129.11, 251/129.12, 129.13, 215, 218, 330, 903
See application file for complete search history.

(56) References Cited

U.S. PATENT DOCUMENTS

| | | | |
|---|---|---|---|
| 3,054,422 A | * | 9/1962 | Napolitano ................ 137/509 |
| 3,488,030 A | | 1/1970 | Hulme et al. |
| 3,807,456 A | | 4/1974 | Colletti |
| 4,351,859 A | * | 9/1982 | Hartmann .................. 427/232 |
| 4,364,111 A | | 12/1982 | Jocz |
| 4,556,193 A | | 12/1985 | Yoshiga |
| 4,574,686 A | * | 3/1986 | Budzich ...................... 91/35 |
| 4,601,310 A | | 7/1986 | Phillips |
| 4,698,998 A | | 10/1987 | Varnagy |
| 4,728,075 A | | 3/1988 | Paradis |
| 4,830,331 A | | 5/1989 | Vindum |
| 5,538,028 A | | 7/1996 | Lombardo |
| 5,646,664 A | | 7/1997 | Pawlowski et al. |
| 6,405,758 B1 | | 6/2002 | Hara |
| 6,764,060 B1 | * | 7/2004 | Fukano et al. ......... 251/129.12 |

* cited by examiner

*Primary Examiner*—Edward K. Look
*Assistant Examiner*—John K. Fristoe, Jr.
(74) *Attorney, Agent, or Firm*—Stephen C. Beuerle; Procopio, Cory, Hargreaves & Savitch LLP

(57) ABSTRACT

A needle valve assembly for providing fluid flow control includes a motor; an internally threaded valve body; and an externally threaded plunger threadably engaged with the internally threaded valve body and rotatably and reciprocally driven by the motor, wherein the valve body including a fluid inlet, a fluid outlet, and a flow chamber therebetween, the flow chamber including a flow chamber wall and a flow chamber outlet, the plunger including a flexible needle member reciprocating within the flow chamber outlet to provide variable flow control therethrough, the flexible needle member including a lip seal engageable with the flow chamber wall during reciprocation of the plunger and flexible needle member to provide a seal therebetween.

18 Claims, 4 Drawing Sheets

NEEDLE VALVE FOR FLOW CONTROL

FIELD OF THE INVENTION

The field of this invention relates, in general, to needle valves for control of fluid flow and, in particular, to a needle valve for control of product flow in oxygen concentrators.

BACKGROUND OF THE INVENTION

Oxygen concentrators are commonly used in the home medical market to treat patients with chronic obstructive pulmonary diseases. Due to the wide availability of these oxygen concentrators on the market, the market for these devices is highly cost competitive and is expected to become even more competitive in the future. In order to remain competitive in this market, it is critical to reduce the manufacturing cost associated with every component in the oxygen concentrator system. The flow measurement and control system is one aspect of the overall concentrator system that may be cost-reduced; however, a less expensive flow system will only be viable if it provides sufficient accuracy and reliability.

Commercially available oxygen concentrators generally use one of two technologies to control the flow of product gas. The most common is a rotameter (flowmeter with a floating ball) combined with a manually controlled needle valve. Rotameters may be inexpensive, but in order to maintain accuracy, they are often coupled with a pressure regulator. Even combined with the regulator, due to pressure variations downstream of the rotameter, these needle valve/rotameter combinations provide an accuracy of about 10% which is sufficient for most home medical oxygen concentrators. Nonetheless, once combined with a regulator, this control method would not be considered inexpensive.

Another common technology is the use of an orifice plate in combination with a pressure regulator. The orifice plate usually contains 10 or more precision orifices, each providing an exact flow when an exact pressure is provided on the feed side. The regulator is used to provide a fixed pressure on the feed side. The orifice plate/regulator combination functions by allowing the user to adjust a dial to a specific orifice in order to provide a specific product flow. This method of flow control is generally more accurate than a rotameter; however, it is also more expensive and is also subject to inaccuracy due to downstream pressure fluctuations.

A need clearly exists for a low-cost, accurate flow control system for an oxygen concentrator. One method of achieving this goal makes use of the increasingly common use of acoustic systems to measure oxygen concentration in oxygen concentrators. For negligible additional cost, these acoustic systems can be modified to measure oxygen flow in addition to concentration Coupling the flow measurement with an inexpensive motorized valve would result in a low-cost, accurate flow control system.

SUMMARY OF THE INVENTION

To solve these problems and others, an aspect of present invention relates to a method of providing fluid flow control in a needle valve assembly. The method includes providing a needle valve assembly comprising a motor, an internally threaded valve body, and an externally threaded plunger threadably engaged with the internally threaded valve body and rotatably and reciprocally driven by the motor, the valve body including a fluid inlet, a fluid outlet, and a flow chamber therebetween, the flow chamber including a flow chamber wall and a flow chamber outlet, the plunger including a flexible needle member that reciprocates within the flow chamber outlet to provide variable flow control therethrough, the flexible needle member including a lip seal that engages the flow chamber wall during reciprocation of the plunger and flexible needle member to provide a seal therebetween; supplying fluid flow to the fluid inlet of the needle valve assembly; providing variable flow control in the needle valve assembly through reciprocation of the flexible needle member in the flow chamber outlet; and sealingy engaging the flow chamber wall with the lip seal of the flexible needle member to prevent fluid flow therebetween.

A further aspect of the invention involves a needle valve assembly for providing fluid flow control. The needle valve assembly includes a motor; an internally threaded valve body; and an externally threaded plunger threadably engaged with the internally threaded valve body and rotatably and reciprocally driven by the motor, wherein the valve body including a fluid inlet, a fluid outlet, and a flow chamber therebetween, the flow chamber including a flow chamber wall and a flow chamber outlet, the plunger including a flexible needle member reciprocating within the flow chamber outlet to provide variable flow control therethrough, the flexible needle member including a lip seal engageable with the flow chamber wall during reciprocation of the plunger and flexible needle member to provide a seal therebetween.

A further aspect of the invention relates to the flexible, elastomeric nature of the flexible needle member of the valve. The flexible characteristics of the material reduces the amount of torque required to seal the valve compared to the prior art and the amount of precision required in the valve components in order to insure a complete seal.

A further aspect of the invention involves the capability to adjust flow under varying downstream pressure effects. The invention coupled with control and measurement electronics enables the device to keep the flow at the set-point value regardless of upstream or downstream pressure effects.

A further aspect of the invention is the small number of parts required for the needle valve assembly. Fewer parts leads to the low manufacturing cost of the valve which is critical for the application.

Further objects and advantages will be apparent to those skilled in the art after a review of the drawings and the detailed description of the preferred embodiments set forth below.

DETAILED DESCRIPTION OF PREFERRED EMBODIMENTS

Figure 1:
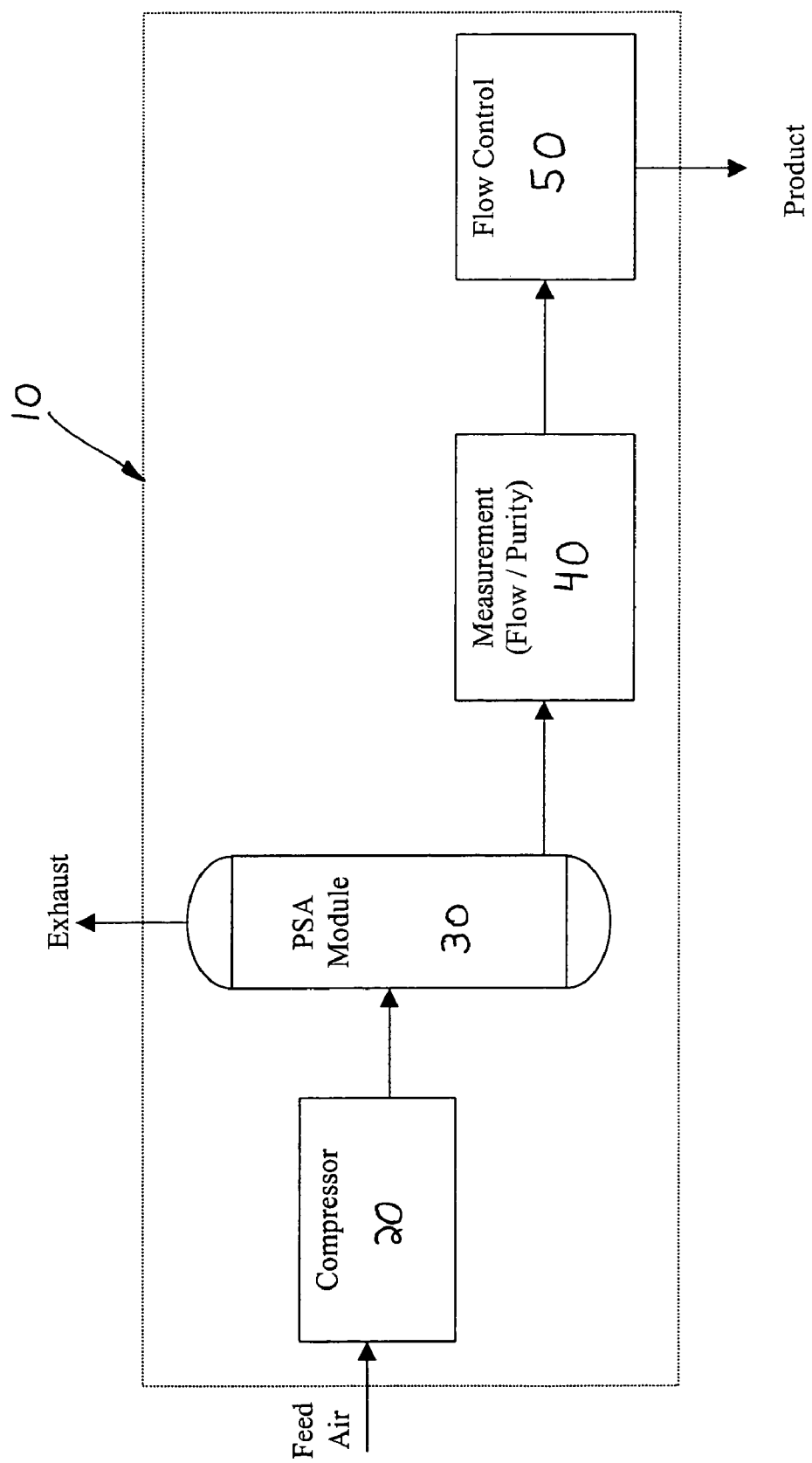
FIG. 1 is a simple schematic of an embodiment of a gas separation device.

With reference to FIG. 1, a gas separation device 10 constructed in accordance with an embodiment of the invention will first be described before describing an embodiment of a needle valve assembly 100. The gas separation device 10 may include a compressor 20, a Pressure Swing Adsorption (PSA) Module or concentrator 30, a measurement mechanism 40, and a flow control mechanism 50. In use, a feed fluid such as ambient air may be drawn into the compressor 20 and delivered under high pressure to the PSA Module 30. The PSA module 30 separates a desired product fluid (e.g., oxygen) from the feed fluid (e.g., air) and expels exhaust fluid. Characteristics of the product fluid (e.g., flow/purity) may be measured by a measurement mechanism 40. Delivery of the product fluid may be controlled with the flow control mechanism 50.

Figure 2:
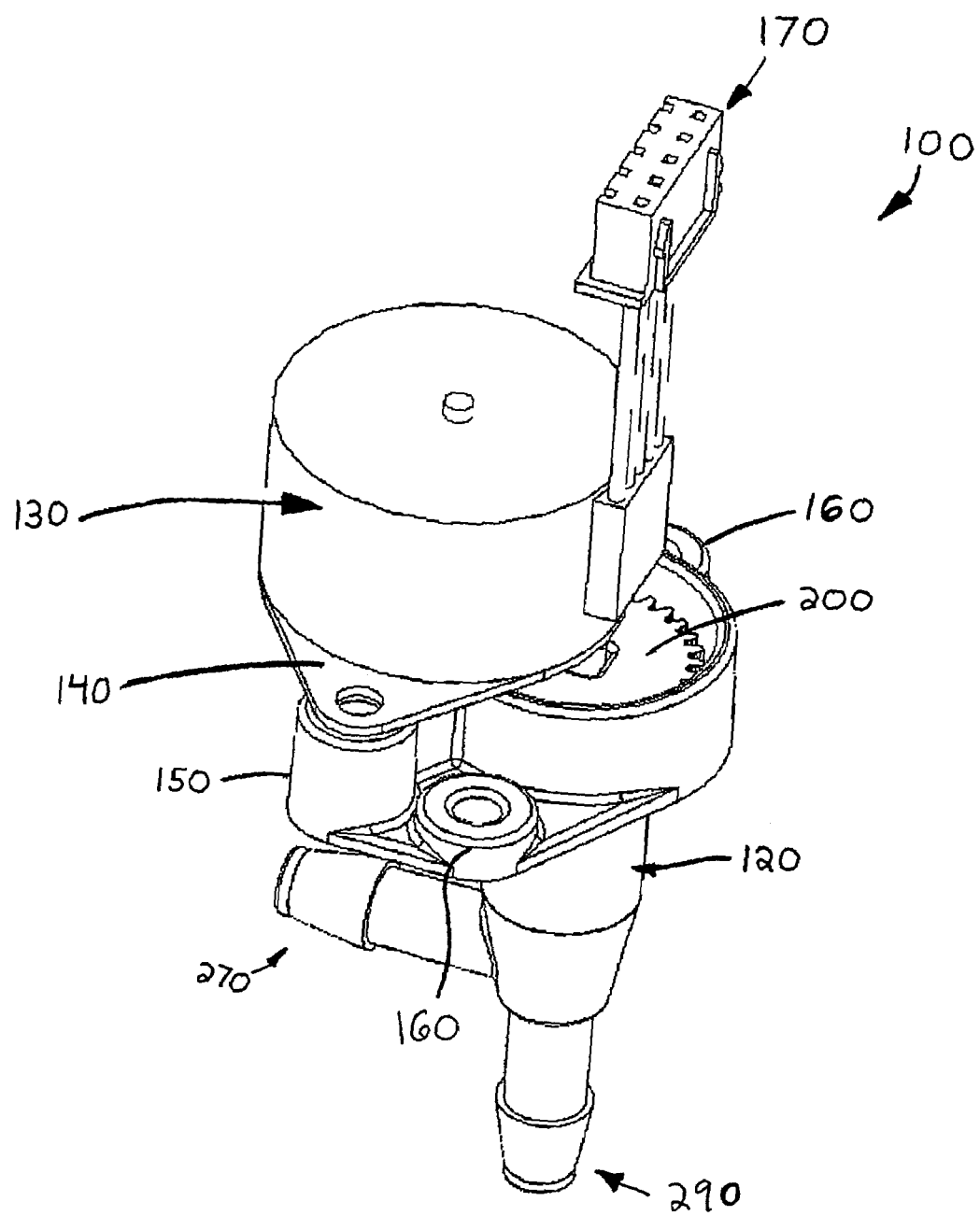
FIG. 2 is a perspective view of an embodiment of a needle valve assembly.
Figure 3:
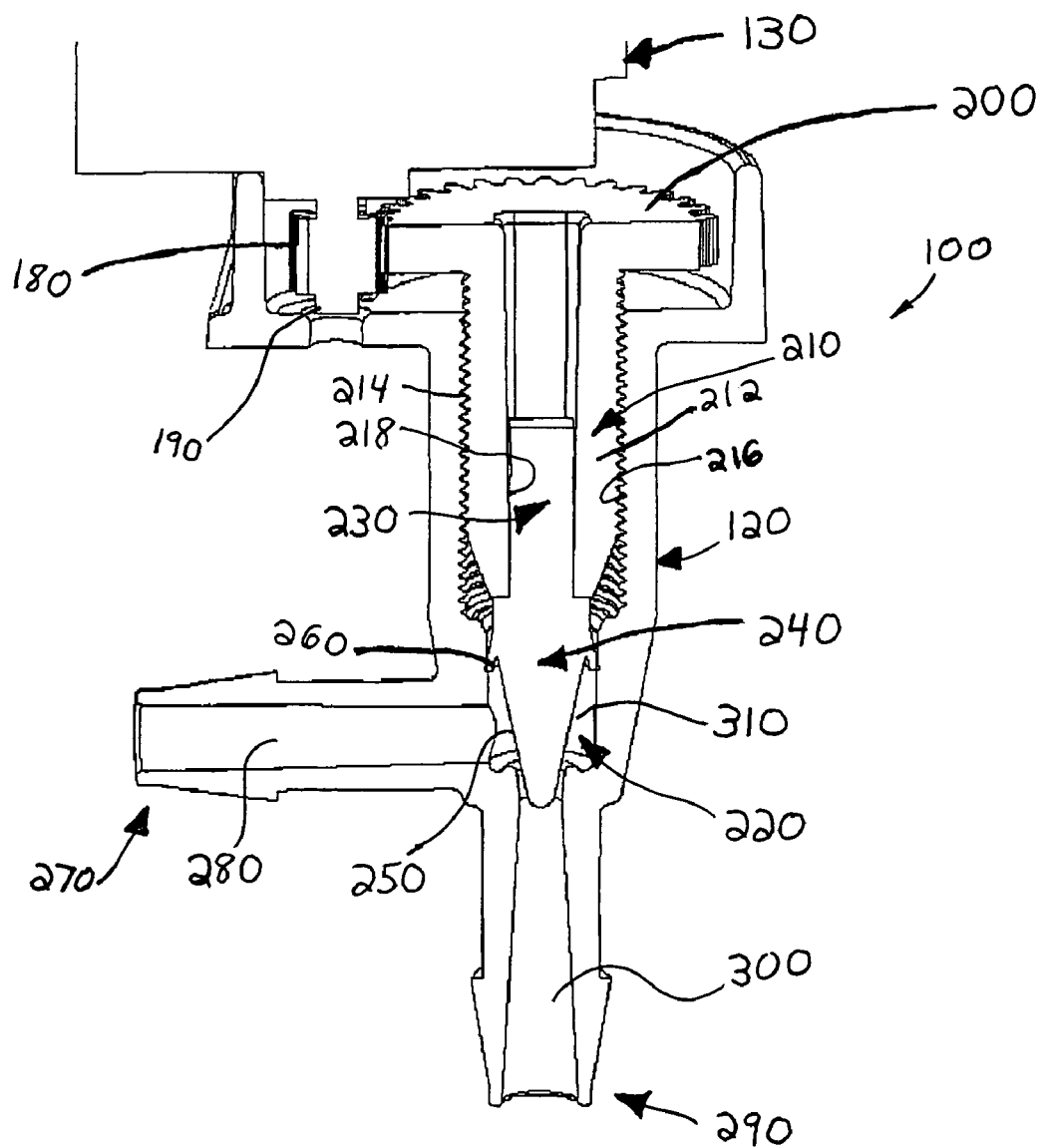
FIG. 3 is a partial cross-sectional view of the needle valve assembly of FIG. 2.
Figure 4:
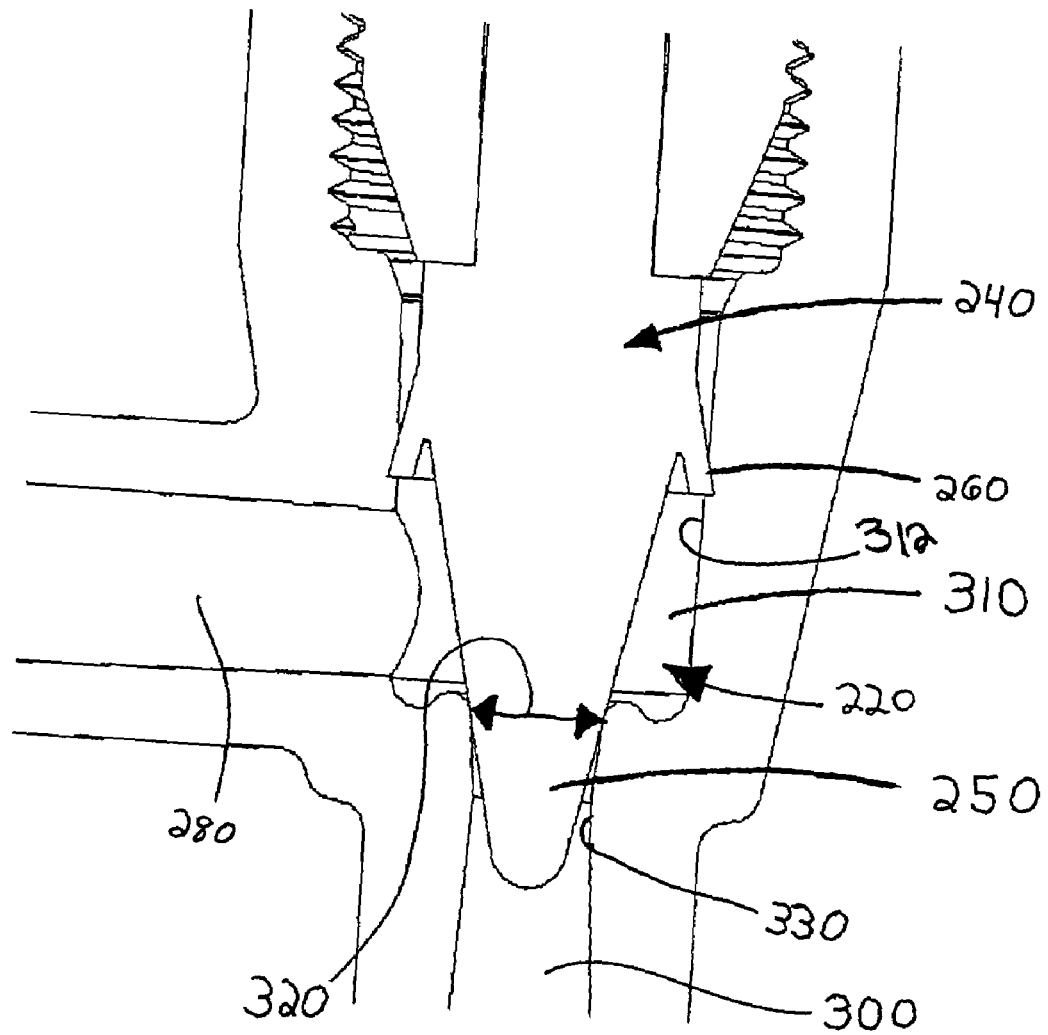
FIG. 4 is an enlarged cross-sectional view of a portion of the needle valve assembly of FIG. 3.

With reference to FIGS. 2–4, an embodiment of a needle valve assembly 100 that is ideal for use in a flow control mechanism 50 of a gas separation device 10 will now be described. The needle valve assembly 100 includes a one-piece valve body 120 and a motor 130. The motor 130 includes a motor mount 140 for mounting the motor 130 to motor mount bosses 150 of the valve body 120. Threaded fasteners (not shown) may be used to secure the motor mount 140 to the motor mount bosses 150. The valve body 120 may include additional mounting bosses 160 for mounting the needle valve assembly 100 to another component of the gas separation device 10. Power and control may be supplied to the motor 130 through an electrical connector 170. A motor gear 180 (FIG. 3) is carried on a motor shaft 190. The motor 130 is a stepper motor that rotates the motor shaft 190 and the motor gear 180 in a clockwise or counter-clockwise manner. In the embodiment shown, the motor 130 is a 48 step/rev stepper motor that provides roughly ¼ Liter per minute flow resolution with a feed pressure of 10 psig. In other embodiments, the motor 130 may have more or less than 48 steps/rev to provide either finer resolution with more steps/rev or faster response with less steps/rev.

A geared screw 200 of a reciprocating and rotating plunger 210 is operatively engaged with the motor gear 180. In the embodiment shown, the gear ratio of the geared screw 200 to the motor gear 180 is 4:1. The gear ratio affects the torque and resolution of the needle valve assembly 100. In an alternative embodiment, motor 130 could operate as a direct drive without motor gear 180 when the torque is sufficiently small. In another alternative embodiment, the gear ratio of the geared screw 200 to the motor gear 180 could be as high as necessary (e.g., 100:1) to provide the increased resolution and higher torque that might be required in large systems. The rotating plunger 210 includes a plunger shaft 212 with external threads 214 that are threadingly engaged with internal threads 216 of the valve body 120 and a bore 218. An elastomeric, flexible, one-piece needle member 220 includes a shaft 230 received within the bore 218, and a head 240. In the preferred embodiment, the shaft 230 and bore 218 have non-circular (e.g., square) cross sections such that when the rotating plunger 210 is rotated, the flexible needle member 220 will also rotate. The head 240 of the needle member 220 includes a tip portion 250 and an integral lip seal 260. In an alternative embodiment, the lip seal 260 may be a separate element from the needle member 220.

With reference to FIGS. 3 and 4, the valve body 120 includes an inlet 270 having an inlet passage 280, an outlet 290 having an outlet passage 300, and a flow chamber 310 including flow chamber wall 312. The tip potion 250 of the needle member 220 is disposed in the flow chamber 310. Near an interface of the outlet passage 300 and the flow chamber 310, the valve body 120 includes a flow chamber outlet port 320. Outlet passage walls 330 terminate at one end at the outlet port 320.

With reference to FIGS. 2–4, the needle valve assembly 100 will now be described in use. The motor 130 rotates the motor shaft 190 in a clockwise or counter-clockwise manner, causing motor gear 180 to rotate in a opposite manner. Rotation of motor gear 180 causes geared screw 200 and externally threaded plunger 210 to rotate. Rotation of the externally threaded plunger 210 within internally threaded valve body 120 causes the plunger 210 and, hence, the elastomeric needle member 220, to reciprocate within the valve body 120, depending on the direction of rotation of the motor 130. Movement of the top portion into and out of the flow chamber outlet port 320 creates a variable orifice in the needle valve assembly 100. Increased movement of the elastomeric needle member 220 towards the flow chamber outlet port 320 causes the tip portion 250 to further block the flow chamber outlet port 320, further inhibiting or stopping fluid flow through the inlet passage 280, flow chamber 310, and outlet passage 300. The flexible, elastomeric nature of the needle member 220 allows the tip portion 250 to flex and seal against the outlet passage walls 330 as the needle member 220 is moved towards the flow chamber outlet port 320. The flexible, elastomeric needle member 220 relaxes concentricity requirements and minimizes the required torque by the motor 130 to reduce or stop flow through the needle valve assembly 100. Increased movement of the elastomeric needle member 220 away from the flow chamber outlet port 320 causes the tip portion 250 to further withdraw and increase the opening at the flow chamber outlet port 320, further increasing fluid flow through the inlet passage 280, flow chamber 310, and outlet passage 300. Pressure on the lip seal 260 and the needle member 220 keeps the tip portion 250 engaged. Thus, by controlling reciprocating movement of the needle member 220, fluid flow through the needle valve assembly 100 is controlled. While the elastomeric needle member 220 reciprocates in the valve body 120, the flexible, elastomeric lip seal 260 sealingly engages the flow chamber walls 312, preventing the escape of fluid flow through this part of the valve body 120. This lip seal 260 is integrally formed with the elastomeric, one-piece needle member 220. As mentioned above, in an alternative embodiment, the lip seal 260 may be separate from the elastomeric needle member 220. The lip seal 260 eliminates the need for a gasket or o-ring for sealing within the valve body 120. The lip seal 260 additionally allows the volume of the flow chamber 310 to be minimized, further reducing the size of the needle valve assembly 100. Relative to other types of gaskets, the lip seal 260, and specifically the small size and the small diameter of the lip seal 260, functions to lower the torque required by the motor 130 to operate the needle valve assembly 100. Use of integrated lip seal 260 eliminates the need for an o-ring or an external lip seal, which add additional complexity in the design. Thus, the main advantages to the lip seal 260 are reduced cost through a reduced number of parts and reduced torque required by the motor.

Utilizing a 48 step/rev stepper motor and a gear ratio of 4:1 for the geared screw 200 and the motor gear 180 provides about 120 steps between the closed and the full-flow positions. In alternative embodiments, a larger or smaller number of steps could be specified to provide either more precision or faster adjustment. Because resolution of the flow control in the needle valve assembly 100 is a function of the motor 130 and the gear ratio, the pressure differential resolution can be increased or decreased in the needle valve assembly 100 by adjusting these two variables. Utilizing a higher gear ratio between the geared screw 200 and the motor gear 180 allows a smaller motor 130 to be used and allows for precise movement of the needle member 220 for precise fluid flow control and improved flow control accuracy of less than about ¼ Liter per minute at 10 psig. However, this accuracy could be adjusted by changing the gear ratio and the stepper motor.

In an alternative embodiment, the head 240 of the elastomeric needle member 220, the flow chamber 310, and the outlet passage 300 may be longer and narrower, or shorter and wider than that shown in FIGS. 1–3 to allow increased or decreased resolution of the flow control.

The needle valve assembly 100 consists of three main parts: 1) the stepper motor 130, 2) the internally threaded valve body 120, and 3) the externally threaded plunger 210 with needle member 220. This simple construction of the needle valve assembly 100 allows the needle valve assembly 100 to be smaller, have less parts, be more precise (when coupled with closed-loop control electronics), and less expensive to manufacture than needle valve assemblies in the past, making the needle valve assembly 100 an economic means to provide flow control in a flow control mechanism 50 of a gas separation device 10.

It will be readily apparent to those skilled in the art that still further changes and modifications in the actual concepts described herein can readily be made without departing from the spirit and scope of the invention as defined by the following claims.

I claim:

1. A method of providing fluid flow control in a needle valve assembly, comprising:
   providing a needle valve assembly comprising a motor, an internally threaded valve body, and an externally threaded plunger threadably engaged with the internally threaded valve body and rotatably and reciprocally driven by the motor, the motor and the plunger including respective gears and the gear ratio of the gear of the plunger to the gear of the motor being at least 1:1, the valve body including a fluid inlet, a fluid outlet, and a flow chamber therebetween, the flow chamber including a flow chamber wall and a flow chamber outlet, the plunger including a flexible needle member that reciprocates within the flow chamber outlet to provide variable flow control therethrough, the flexible needle member including a lip seal that engages the flow chamber wall during reciprocation of the plunger and flexible needle member to provide a seal therebetween;
   supplying fluid flow to the fluid inlet of the needle valve assembly;
   providing variable flow control in the needle valve assembly through reciprocation of the flexible needle member in the flow chamber outlet;
   sealingy engaging the flow chamber wall with the lip seal of the flexible needle member to prevent fluid flow therebeween.

2. The method of claim 1, wherein the flexible needle member is a one-piece member with the lip seal integrally formed therein.

3. The method of claim 1, wherein the motor is a stepper motor including at least 24 steps/revolution.

4. The method of claim 1, wherein the motor is a stepper motor.

5. A method of providing fluid flow control in a needle valve assembly, comprising:
   providing a needle valve assembly comprising a motor, an internally threaded valve body, and an externally threaded plunger threadably engaged with the internally threaded valve body and rotatably and reciprocally driven by the motor, the valve body including a fluid inlet, a fluid outlet, and a flow chamber therebetween, the flow chamber including a flow chamber wall and a flow chamber outlet the plunger including a flexible needle member that reciprocates within the flow chamber outlet to provide variable flow control therethrough, the flexible needle member including a lip seal that engages the flow chamber wall during reciprocation of the plunger and flexible needle member to provide a seal therebetween;
   supplying fluid flow to the fluid inlet of the needle valve assembly;
   providing variable flow control in the needle valve assembly through reciprocation of the flexible needle member in the flow chamber outlet;
   sealingy engaging the flow chamber wall with the lip seal of the flexible needle member to prevent fluid flow therebeween,
   wherein the needle valve assembly is part of a flow control mechanism of a gas separation device for separating oxygen gas from air, and the method includes separating oxygen gas from air using the gas separation device and controlling product flow in a flow control mechanism using the needle valve assembly.

6. The method of claim 5 wherein the flexible needle member is a one-piece member with the lip seal integrally formed therein.

7. The method of claim 5 wherein the motor is a stepper motor including at least 24 steps/revolution.

8. The method of claim 5 wherein the motor and the plunger include respective gears and the gear ratio of the gear of the plunger to the gear of the motor is at least 1:1.

9. The method of claim 5 wherein the motor is a stepper motor, and the motor and the plunger include respective gears.

10. A needle valve assembly for providing fluid flow control, comprising:
    a motor;
    an internally threaded valve body; and
    an externally threaded plunger threadably engaged with the internally threaded valve body and rotatably and reciprocally driven by the motor, the motor and the plunger including respective gears and the gear ratio of the gear of the plunger to the gear of the motor being at least 1:1;
    wherein the valve body including a fluid inlet, a fluid outlet, and a flow chamber therebetween, the flow chamber including a flow chamber wall and a flow chamber outlet, the plunger including a flexible needle member reciprocating within the flow chamber outlet to provide variable flow control therethrough, the flexible needle member including a lip seal engageable with the flow chamber wall during reciprocation of the plunger and flexible needle member to provide a seal therebetween.

11. The needle valve assembly of claim 10, wherein the flexible needle member is a one-piece member with the lip seal integrally formed therein.

12. The needle valve assembly of claim 10, wherein the motor is a stepper motor including at least 24 steps/revolution.

13. The needle valve assembly of claim 10 wherein the motor is a stepper motor.

14. A needle valve assembly for providing fluid flow control, comprising:
    motor;
    an internally threaded valve body; and an externally treaded plunger threadably engaged with the internally threaded valve body and rotatably and reciprocally driven by the motor, wherein the valve body including a fluid inlet, a fluid outlet, and a flow chamber therebetween, the flow chamber including a flow chamber wall and a flow chamber outlet, the plunger including a flexible needle member reciprocating within the flow chamber outlet to provide variable flow control therethrough, the flexible needle member including a lip seal engageable with the flow chamber wall during reciprocation of the plunger and flexible needle member to provide a seal therebetween, wherein the needle valve assembly is part of a flow control mechanism of a gas separation device for separating oxygen gas from air.

15. The method of claim 14, wherein the flexible needle member is a one-piece member with the lip seal integrally formed therein.

16. The method of claim 14, wherein the motor is a stepper motor including at least 24 steps/revolution.

17. The method of claim 14, wherein the motor and the plunger include respective gears and the gear ratio of the gear of the plunger to the gear of the motor is at least 1:1.

18. The method of claim 14, wherein the motor is a stepper motor, and the motor and the plunger include respective gears.

* * * * *